May 16, 1939.  W. W. BIRNSTOCK  2,158,396
PISTOL ROD
Filed Jan. 8, 1937
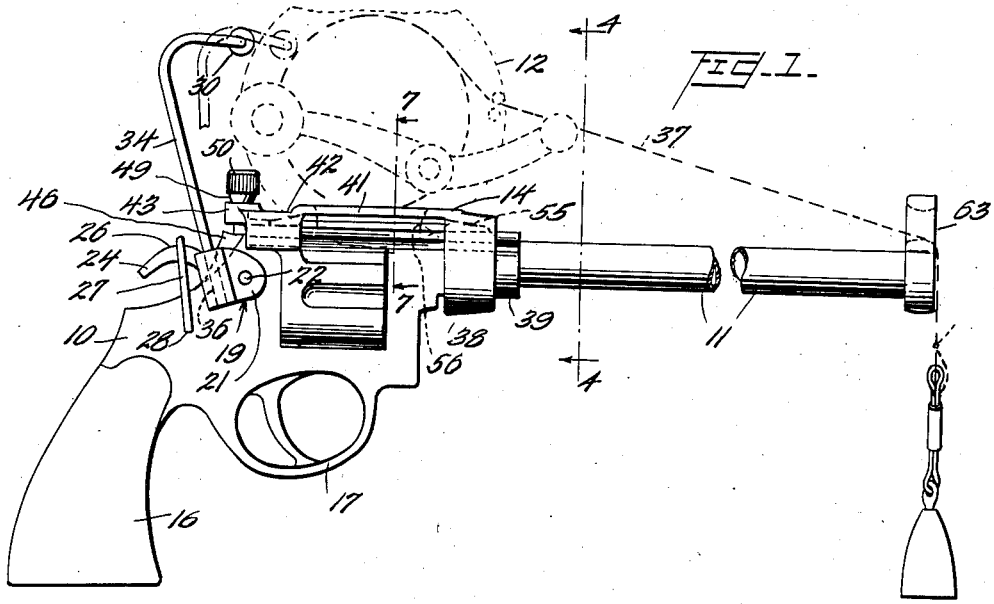
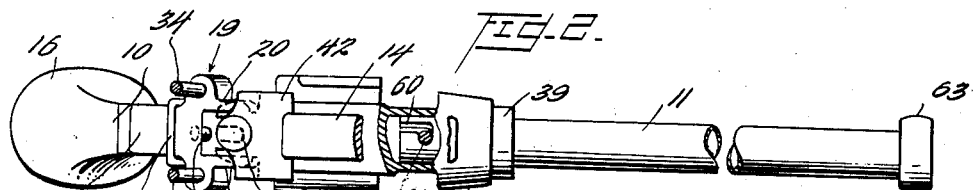
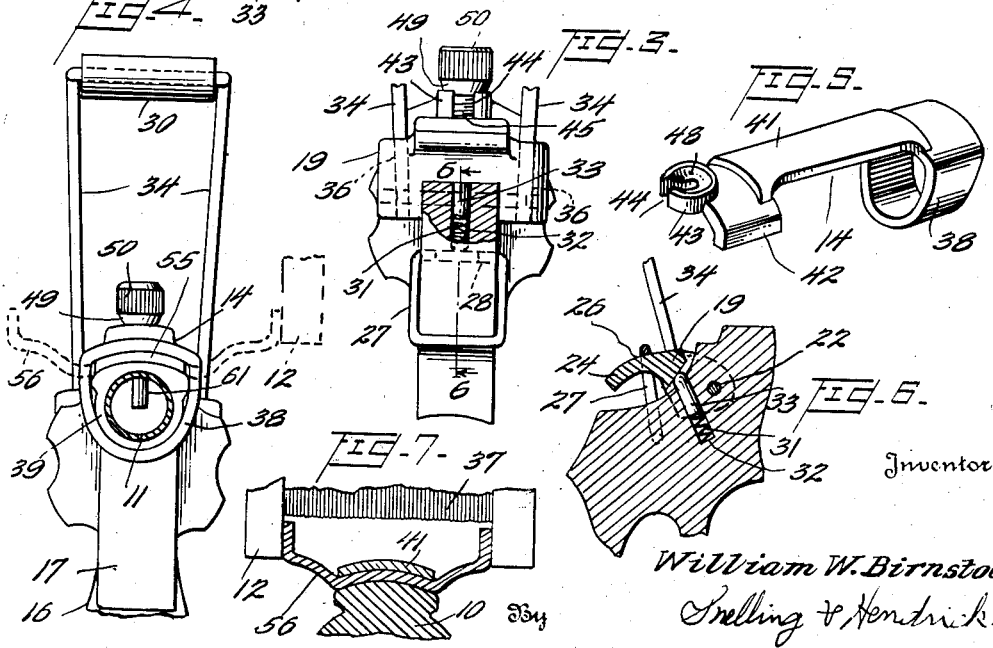
Inventor
William W. Birnstock
By Snelling & Hendricks
Attorneys Patented May 16, 1939

2,158,396

UNITED STATES PATENT OFFICE 2,158,396

PISTOL ROD

William W. Birnstock, York, Pa.

Application January 8, 1937, Serial No. 119,695

6 Claims. (Cl. 43—19)

This invention relates to fishing rods and particularly to rods of the type used in casting which are usually provided with reels. The primary object of the invention is to provide a compact fishing rod which permits more accurate casting, is more bite-sensitive, and is less tiring to hold while waiting for a bite than is the ordinary fishing rod.

Another object of the invention is to provide a casting rod which requires very little overhead room for casting and for drawing in the catch.

A further object of the invention is the provision of a compact fishing rod and reel which may be easily and quickly disassembled and assembled.

An important object of the invention is to provide a simple but sturdy reel holding clip which may be manipulated with ease to secure a reel to a fishing rod and may be easily released for removing the reel from the rod.

An object of the invention is the provision of a light reel holding clamp or clip which cooperates with a standard reel base to cause the reel to wedge into tighter engagement with the rod when the line is jerked or drawn tight during fishing. Incidentally it is an object of the invention to provide a reel clamp which prevents the reel from turning on the handle.

A still further object of the invention is to provide an automatic casting brake having a thumb-operated control means for adjusting the brake action.

In carrying out the objects of my invention I provide a handle which very closely resembles the ordinary pistol but which has a removable barrel of any desired length. On top of the barrel and extending back to the usual hammer position I locate a reel holding clip which clip is provided with a sleeve at its forward end for encircling the pistol barrel and is provided at the rear end with means such as a slot for receiving a locking device, as for example, a set screw projecting upwardly from a pistol-like handle. The sleeve and the locking end are connected together by a bar which is adapted to pass between the spool and the reel support or base and when locked in place the holder firmly secures the reel to the rod but may be quickly released by loosening the locking member. The reel holder is adapted to fit the standard reel support now provided on almost all kinds of casting reels. Just back of the locking device I pivot a spring pressed line brake which when released engages the line and retards or prevents the reel from turning. This brake is provided with a fairly strong spring but may be prevented from acting by means of a latch which is adapted to be pushed over a thumb lever extending back toward the pistol grip. Due to its appearance and method of handling I call my improved rod a pistol rod.

Figure 1 is a side elevation of the completely assembled unit showing some of the parts broken away.

Figure 2 is a plan view of the device shown in Figure 1 but with the reel removed, and parts in section.

Figure 3 is a fragmentary rear view of the handle partly in section.

Figure 4 is a sectional elevation taken on line 4—4 of Figure 1.

Figure 5 is a perspective view of the reel holder separated from the rod handle.

Figure 6 is a vertical section taken on line 6—6 of Figure 3.

Figure 7 is a vertical section taken on the line 7—7 of Figure 1.

As shown in Figure 1 my improved pistol rod consists of a handle portion 10 which preferably may be of a single piece of aluminum or other light material, a hollow rod 11 preferably of brass which may be removably connected with the handle, and a reel 12 removably mounted on the handle 10 by means of the reel holder 14.

The handle of the pistol rod may consist of an aluminum casting closely resembling the ordinary revolver having a grip 16 and a trigger and trigger guard 17. In place of the usual hammer I pivot a bufurcated brake holder 19 having two legs 20 and 21 straddling the upper part of the pistol body and carried on a pin 22. Projecting backward from the brake holder is a thumb piece 24 which has a hump 26 for engaging the release lock 27 which is also pivoted in the handle at 28 and which may be pulled back from the hump to permit the brake 30 to be pressed into engagement with the reel by means of a fairly strong compression spring 31 carried in the bore 32 in the handle and acting on the outwardly projecting pin 33 engaging the bottom of the brake carrier. The brake 30 is a tube of rubber carried on the horizonal portion of a stiff wire loop 34 the lower ends of which fit tightly in bores 36 of the brake carrier 19. The brake is adapted to engage the line 37 with a force sufficient to prevent rotation of the reel.

My improved reel holder 14 may be used on almost any kind of rod with slight alteration but I have illustrated it as mounted on my improved pistol grip rod. As shown in the drawing the reel holder consists of a slightly tapered sleeve 38 which is of somewhat greater diameter than the barrel end 39 of the handle 10 which end may be correspondingly tapered. The sleeve is connected by a longitudinal bar 41 with an inverted U-shaped shoe 42 having a rearwardly projecting lug 43 which lug is preferably slotted as at 44 for receiving a locking bolt or pin such as that shown at 45 rising from the stud 46 just forward of the brake holder 19. The lug 43 may be counter sunk as at 48 for receiving the spherical bottom 49 of the set nut 50. It is almost a universal practice of reel makers to give a slight taper to the horns or ends 55 of the reel base 56 and for this reason as shown in Figure 1 I give a slight taper to the inside of the sleeve 38 at least to the portion adjacent the bar 41. In my device this taper functions to cause a wedging action which increases with tugging and pulling on the line so that it is practically impossible to loosen the reel except by the means provided. It will be noted especially in Figure 4 that due to the non-cylindrical shape of the barrel and sleeve the reel cannot turn about the barrel 39.

The rod 11 which preferably is quite short, ranging from about six inches to two or three feet depending on the wishes of the fisherman, is provided with a bayonet slot 60 for engaging a pin 61 in the pistol barrel 39 which pin is positioned to hold the rod so that the line guide 63 is in an upright position at all times.

In casting I find the best practice to be to handle the pistol rod in almost the same manner as one uses a revolver in target practice, that is, holding the pistol rod as if it were a gun, it should be brought back over the shoulder, first having released the reel brake and also setting the line brake by pulling back the loop 27, then as the gun is whipped forward in an arc the thumb lever 24 is depressed slightly at the top of the arc which allows the hook to unreel the line and fly to the target. With a little practice one becomes quite skillful in throwing the hook exactly where it is desired with a great deal more accuracy than is possible with an ordinary rod. The rod may be swung in an arc at the side of the body where there is no room for the overhead swing.

What I claim is:

1. In a casting rod, a pistol shaped handle having a bore therein for receiving a rod, a rod fitting in said bore and having a bayonet slot therein, and means in the bore engaging in said bayonet slot whereby the rod may be removed.

2. A handle for a fishing rod comprising a single casting of substantially the same shape as a pistol and having a short bored barrel for receiving a rod, a reel holder on said handle comprising a slightly tapered sleeve encircling said barrel and having a diameter greater than the outside diameter of the barrel for receiving the tapered end of a reel base, said holder having a raised longitudinal bar projecting rearwardly fom said sleeve and having means at its rear end for locking in position on the handle.

3. The device of claim 3 including a spring pressed line brake pivoted on said handle in proximity to said locking means and above the grip of the handle, said brake having a rearwardly projecting thumb lever adapted to be depressed for releasing the line brake.

4. A reel holding clip for fishing rods comprising a longitudinal bar for overlying the rod engaging portion of a standard reel base, a sleeve on the forward end of said bar having a slightly tapered bore for encircling a rod and for receiving between its inner surface and the rod the slightly tapered end of a standard reel base, said bar having a slot in its rear end for receiving a locking bolt.

5. The device of claim 6 in which said slot is counter sunk for receiving a locking nut.

6. In combination a fishing rod handle having a short barrel for receiving a rod, a reel having a longitudinal base adapted to closely engage the top of said handle including the top of said barrel, a reel holder comprising a sleeve encircling the barrel and the forward end of said base, means connected to said sleeve for engaging the rearward end of said base, locking means for releasably clamping the last-mentioned means to the handle, a spring pressed reel brake pivoted adjacent said locking means, said brake having a thumb lever thereon for retracting the brake and a loop pivoted on said handle for holding said lever in depressed position.

WILLIAM W. BIRNSTOCK.

CERTIFICATE OF CORRECTION.

Patent No. 2,158,396.  May 16, 1939.

WILLIAM W. BIRNSTOCK.

It is hereby certified that error appears in the printed specification of the above numbered patent requiring correction as follows: Page 2, second column, line 16, claim 3, for the claim reference numeral "3" before "including" read 2; line 31, claim 5, for the claim reference numeral "6" read 4; and that the said Letters Patent should be read with this correction therein that the same may conform to the record of the case in the Patent Office.

Signed and sealed this 27th day of June, A. D. 1939.

(Seal)

Henry Van Arsdale
Acting Commissioner of Patents.